United States Patent [19]

Smith et al.

[11] 4,373,377

[45] Feb. 15, 1983

[54] UNIVERSAL TAIL PIPE CONNECTOR

[75] Inventors: Harvey A. Smith, Hampden, Mass.; Joseph T. Fleming, East Granby, Conn.

[73] Assignee: United Technologies Corporation, Hartford, Conn.

[21] Appl. No.: 200,796

[22] Filed: Oct. 27, 1980

[51] Int. Cl.$^3$ .................... G01N 31/00; F16L 17/00
[52] U.S. Cl. ........................................ 73/23; 285/97
[58] Field of Search ........................... 73/23; 141/287; 277/34.3, 34, 34.6; 285/97

[56] References Cited

U.S. PATENT DOCUMENTS

| | | | |
|---|---|---|---|
| 3,023,995 | 3/1962 | Hopkins | 285/97 |
| 3,603,155 | 9/1971 | Morris et al. | 73/23 |
| 3,695,637 | 10/1972 | Satterthwaite et al. | 285/97 |
| 3,830,267 | 8/1974 | Cass | 141/287 |
| 3,917,454 | 11/1975 | Clark | 73/23 |
| 3,934,889 | 1/1976 | Smith | 277/34 |

FOREIGN PATENT DOCUMENTS 1371303  7/1964  France ................................. 285/97

Primary Examiner—Stephen A. Kreitman
Attorney, Agent, or Firm—Dominic J. Chiantera

[57] ABSTRACT

A universal tail pipe connector includes a three-way valve disposed on a hollow, cylindrical housing having inlet and outlet ports in spaced registration along the longitudinal axis of the housing, each having an internal diameter at least as large as the largest outside diameter tail pipe to which connection is required, the connector further including an annular, inflatable seal of elastomeric material disposed in an annular collar portion of the housing adjacent the inlet port, the seal being responsive to positive pressure and vacuum pressure signals provided through the three-way valve from external sources of each in dependence on selectable operation by an operator, for retracting inside the annular collar in response to the vacuum pressure signals to permit unobstructed penetration of the tail pipe through the inlet port into the housing, and for inflating in response to the positive pressure signals to provide a surface seal along the contour of the outside diameter of the enclosed tail pipe.

5 Claims, 4 Drawing Figures

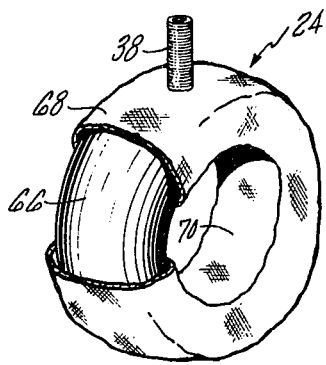
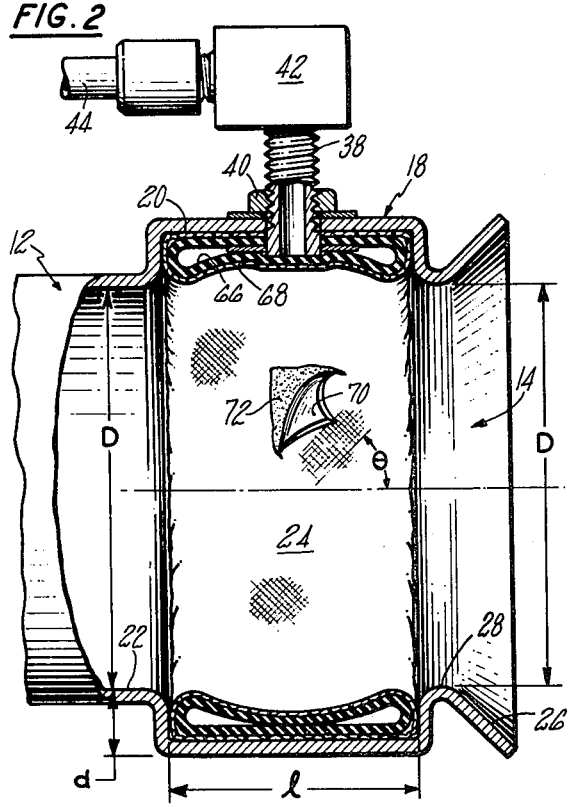
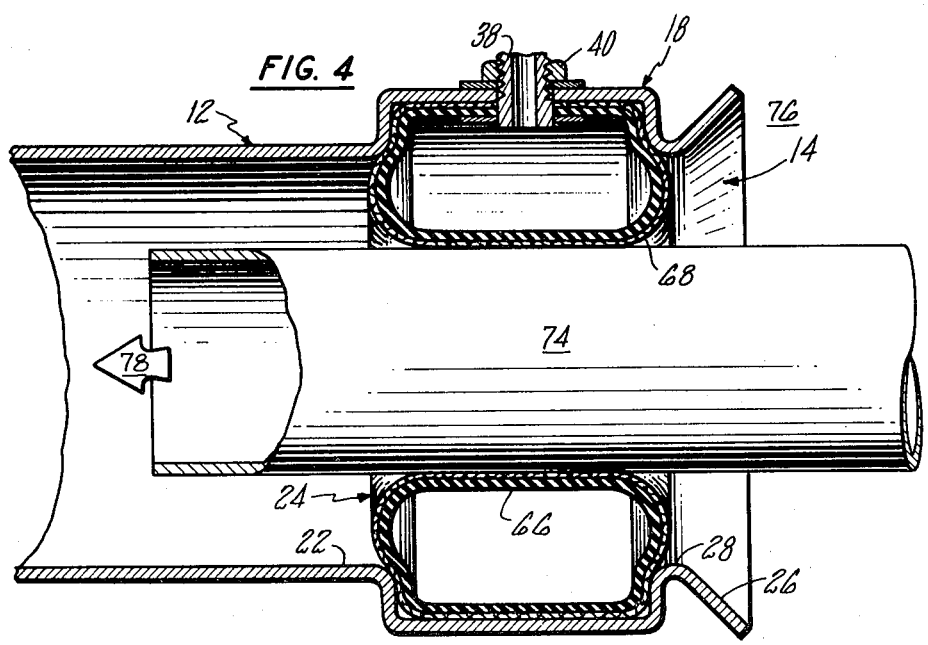

UNIVERSAL TAIL PIPE CONNECTOR

DESCRIPTION

TECHNICAL FIELD

This invention relates to apparatus for use with motor vehicle exhaust emissions testing, and more particularly to apparatus for connecting emissions analyzing equipment to the exhaust tail pipe of a motor vehicle.

BACKGROUND ART

Mass flow analysis of motor vehicle exhaust emissions is used for both diagnosing engine performance and for measuring the amounts of exhaust particulate. The use in diagnosing performance results from the discovery of measurable indicia in the engine exhaust gas which may be correlated with other engine test results to increase the accuracy of the diagnostic routines in isolating engine faults to specific subsystems. The use in particulate mass measurements is the result of mandatory emissions analysis imposed by the laws of many states. In diagnostic use the measuring apparatus may be used to detect or measure selected kinetic properties of the exhaust, i.e. turbulence, sub-cyclic frequency, whereas emissions analysis is concerned with the amounts of particulate.

One major concern in each case is the integrity of the sample. The exhaust gas sample must accurately reflect the dynamic characteristics and content of the exhaust gas, as emitted from the exhaust system of the vehicle. Since the exhaust flow is under positive pressure of the engine exhaust stroking the test apparatus must be interfaced with the vehicle exhaust system in sealed, positive pressure connection to eliminate dilution of the exhaust gas by the ambient air. Any such dilution affects both kinetic properties and mass flow density.

A second major concern is the ability to provide such a pressure seal connection under high volume motor vehicle testing conditions. This requires that the connection interface be capable of quick connection to and disconnection from a number of different make and model vehicles, such as in motor vehicle inspection (MVI) stations. The lack of standardization in the size and geometry of motor vehicle exhaust tail pipes poses a significant problem in providing such an interface. Although there are significant differences in geometry the results of statistical research indicates that at present approximately 86% of the motor vehicles in the Unites States have circular exhaust pipes. The diameter of the exhaust pipes vary significantly, ranging from 1⅜ inches to 2½ inches. The wide variation in tail pipe diameter presents a significant problem in providing a universal connection which can accommodate the nearly two-to-one variation.

DISCLOSURE OF INVENTION

The object of the present invention is to provide a universal tail pipe connector, capable of quick connect and disconnect, for providing a sealed positive pressure connection to circular tail pipes of any diameter.

According to the present invention, a universal tail pipe connecter includes a three-way valve disposed on a hollow cylindrical housing having longitudinally spaced inlet and outlet ports and having an internal diameter which is at least as large as the largest diameter tail pipe, the connector further including an annular inflatable seal of elastomeric material disposed in an annular collar portion of the housing adjacent the inlet port, the seal being responsive, alternately, to positive pressure and vacuum pressure signals presented selectively by an operator through the three-way valve from external sources of each, for retracting inside the annular collar in response to the vacuum pressure signals to permit unobstructed insertion and removal of the tail pipe into the housing, and for inflating in response to the positive pressure signals to provide a surface seal along the outside contour of the inserted tail pipe. In further accord with the present invention, the seal includes an annular inflatable bladder having a pneumatic stem for receiving the pressure signals from the three way valve and for securing the bladder within the annular collar so as to maintain axial registration of the bladder within the housing, the bladder including a sealing surface which contacts the surface area of the inserted tail pipe during inflation of the bladder. In still further accord with the present invention, the seal further includes a thermal protective covering disposed along the sealing surface of the bladder so as to expand and contract in unison therewith during inflation and evacuation of the seal, for providing thermal insulation between the bladder sealing surface and the tail pipe surface. In still further accord with the present invention, the inflatable bladder material comprises high temperature silicone rubber. In still further accord with the present invention, the thermal protective covering comprises a flexible fiberglass material bonded to the sealing surface of the bladder with a high temperature silicone rubber adhesive. In still further accord with the present invention, the thermal protective covering is in the form of a sheath of fiberglass material which encloses the entire surface area of the inflatable bladder, for thermally insulating the bladder from the surface of the exhaust tail pipe and the inside surface of the annular collar of the housing.

The universal tail pipe connector of the present invention allows for the quick connect and disconnect of a positive pressure seal to the exhaust system of any motor vehicle having a circular tail pipe. The connector housing includes a three-way valve responsive to operator control for providing, alternately, positive pressure and vacuum pressure signals from external sources to the inflatable seal, to rapidly inflate and evacuate the seal, allowing rapid connection and disconnection to the vehicle tail pipe. When inflated, the seal provides a pressure tight seal with the tail pipe so as to eliminate any contamination of the motor vehicle exhaust from outside ambient air. The ability to provide quick connection and a pressure tight seal allows the present connector to satisfy both the accuracy demands and the requirements of installation over the existent range of circular tail pipe diameters; greatly enhancing the ability to apply motor vehicle diagnostics to high volume testing conditions.

These and other objects, features, and advantages of the present invention, will become more apparent in light of the following detailed description of a best mode embodiment thereof, as illustrated in the accompanying drawing.

BRIEF DESCRIPTION OF DRAWING(S)

FIG. 2 is a sectioned view of a portion of the tail pipe connector illustrated in FIG. 1;

FIG. 3 is a partially cutaway, perspective illustration of an inflatable seal used in the tail pipe connector of FIG. 1; and FIG. 4 is another illustration of the sectioned view of FIG. 2, illustrating another operating feature of the tail pipe connector of FIG. 1.

BEST MODE FOR CARRYING OUT THE INVENTION

Figure 1:
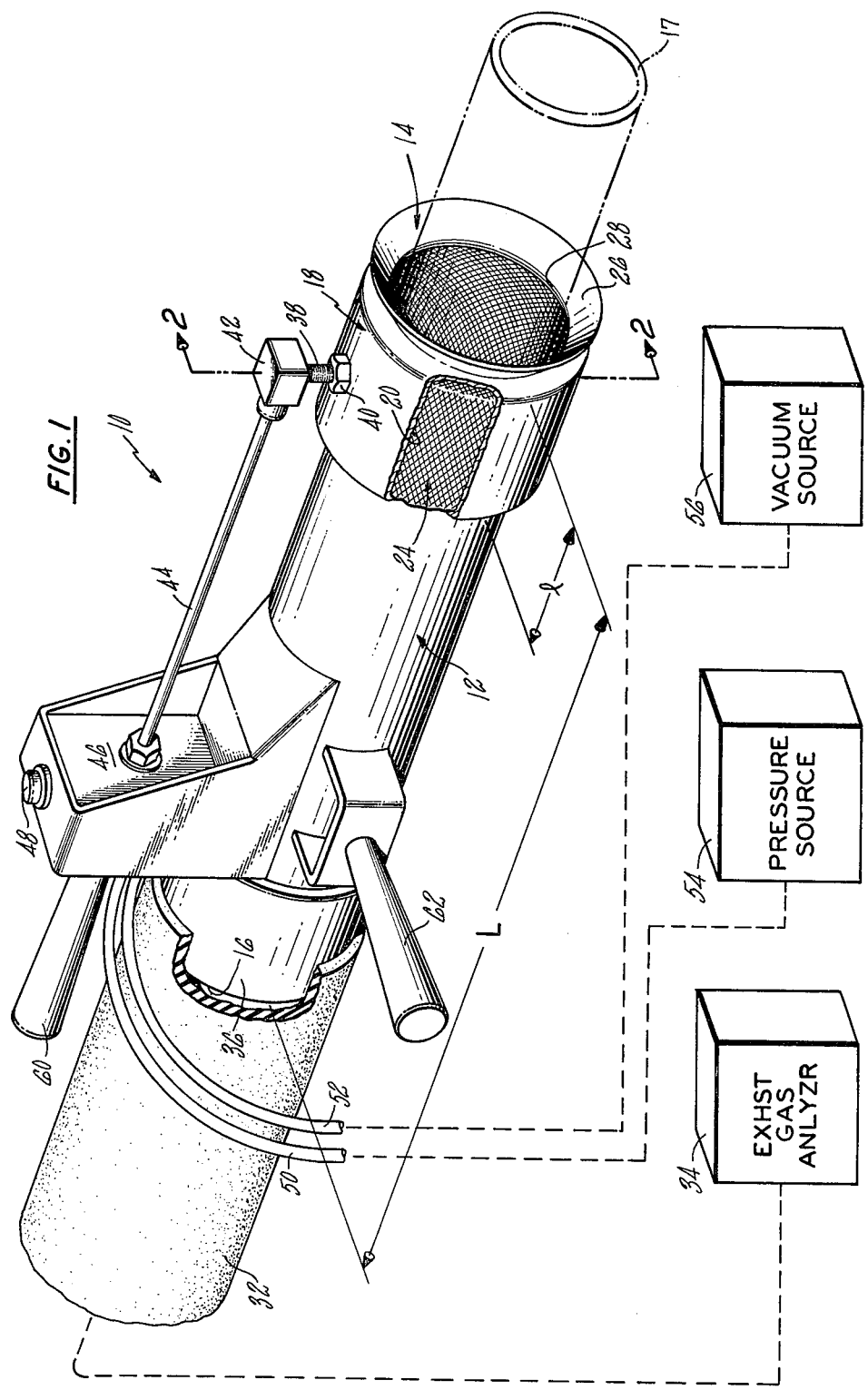
FIG. 1 is a partially cutaway, perspective illustration of a universal tail pipe connector according to the present invention.

FIG. 1 is a perspective, partially cutaway illustration of the universal tail pipe connector 10 of the present invention. The connector includes a hollow, cylindrical housing 12 having inlet and outlet ports 14, 16 in spaced registration along the longitudinal axis of the housing. The housing material may be any of a number of known metal alloys which can withstand the handling, dropping, etc. of a garage type environment, such as carbon steel. The housing and the inlet and outlet ports have an internal diameter (D) which is at least as large as the outside diameter of the largest sized tail pipe 17 (shown in phantom) to be inserted. The end portion of the housing adjacent the inlet port 14 includes an annular collar 18 having a length (1) which is a fraction, on the order of 15% to 20%, of the length (L) of the housing. The collar has an internal diameter greater than that of the housing, so as to form an internal relief, or groove 20 within the housing. The groove has a depth, as measured from the internal wall surface 22 of the housing, which is one-half the difference value between the collar and the housing internal diameters, and provides a recess for securing in an inflatable seal 24 in axial position within the housing. The relief restrains axial movement of the seal along the longitudinal axis of housing during insertion and withdrawal of the vehicle tail pipe, and during inflation and evacuated deflation of the seal, all of which is described in detail hereinafter.

The housing includes a tapered lip portion 26, in the form of a conic mounted at its minimum diameter station 28 to the face of the inlet port. The minimum diameter of the tapered lip is equal to the internal diameter of the housing and forms the mouth of the inlet port, in registration with the internal wall surface 22. The lip functions as a guide for steering the connector over the end of the tail pipe and the minimum diameter of the lip in combination with the shoulder formed at the juncture of the internal wall surface 22 and the internal relief 20 function as an internal guide for the tail pipe. As described hereinafter, when the seal 24 is deflated, its outer surface, i.e. the sealing surface which faces and mates with the tail pipe surface to form a seal, retracts below the surface formed by the internal wall 22 and minimum diameter station 28, such that the tail pipe is received within the housing without abrading the surface of the seal.

The housing includes an adapter 36 at the outlet port 16 which provides a positive pressure seal connection of the housing to a flexible hose 32 connected at the outer end to an exhaust gas analyzer 34, which may be any one of a number of types known in the art. Similarly, the flexible hose may be any of a number of known suitable type hoses, such as a high temperature silicone rubber hose. Neither the analyzer nor the hose itself form any part of the present invention. The actual configuration of the adapter, i.e. the geometry, is that which is necessary to provide a positive pressure seal to the particular type and diameter hose selected. In FIG. 1 the adapter is illustrated as an enlarged diameter section to allow insertion of the adapter into a standard diameter hose. The hose end may be clamped over the adapter (not shown in FIG. 1).

In the operation of the tail pipe connector the inflating and evacuation of the seal 24 is provided by application of a positive pressure (inflating) and a negative, or vacuum pressure (deflating) through a stem 38 inserted in the seal 24, and fitted through an aperture in the annular collar. The stem releasably engages the housing with a mechanical locking device, such as a lock nut 40. This mechanical mounting of the stem 38 fixes the seal 24 in position within the groove 20, and since the seal itself is a wear item which must be periodically replaced the lock nut 40 facilitates replacement.

The stem is connected through a ninety degree pressure fitting 42 and a pressure-vacuum line 44, to a three way valve assembly 46. The line 44 may be a copper tube and the three valve is of a type known in the art, such as the Clippard Model MTV-3. The valve includes a switch 48 responsive to operator control, for selectably connecting a pressure line 50 or a vacuum line 52 to the line 44. The positive and vacuum pressure signal values are typically in a range of zero to 25 PSIG and zero to 25 inches Hg respectively. The lines 50, 52 are flexible to permit movement of the connector assembly by the operator in the connecting to the tail pipe, and each are connected to the outputs of an associated pressure source 54 and vacuum source 56. The sources may also be any one of a number of known types selectable by those skilled in the art for use with the universal connector. Both the pressure and vacuum sources are self-regulated to the selected maximum value, corresponding to that required to fully inflate or evacuate the seal 24. Actuation of the switch 48 by the operator places the valve in a stationary, selected vacuum or pressure state and the sources themselves regulate the magnitude of the applied pressure and/or vacuum signal to the seal.

Since the universal connector is manually connected to the test vehicle tail pipe by an operator, some means of holding the housing is necessary. FIG. 1 illustrates a typical arrangement of handles 60, 62 which are mounted orthogonally to the housing to allow for two degrees of control of the positioning of the housing by the operator. However, any other suitable arrangement, or number of handles may be provided if deemed necessary.

Referring now to FIG. 2, in a sectioned view of the inlet port end of the housing 12, the annular collar 18 with internal diameter d allows the inflatable seal 24 to be nestled within the groove 20 provided by the collar. As stated hereinbefore the groove maintains the seal in axial position, immediately adjacent the mouth of the inlet port 14. FIG. 3 is a cutaway, perspective view of the inflatable seal, which comprises an annular inflatable bladder 66 of elastomeric material, such as high temperature silicone rubber, and a thermal/abrasion protective covering 68. The bladder is a hermetically sealed tube. The seal stem 38 is bonded to the inside wall surface of the bladder and protrudes through the bladder wall and the thermal material covering. The thermal covering comprises a high temperature fiberglass mat material which may be provided as a single layer bonded to the mating surface 70 of the bladder or, alternatively, as a sheath for enclosing the entire bladder as shown in FIG. 3. The covering provides a thermal insulative layer to protect the bladder 66 from the skin temperature of the vehicle exhaust pipe and also to protect the bladder from abrasion by the tail pipe. For surface temperatures of the tail pipe approaching 700° F. the temperature rating of the protective thermal material is on the order of 1000° F.

In FIG. 2 the seal is shown in its evacuated state; the vacuum being provided by the source 56 (FIG. 1) which is steered through the three-way valve 46, the pneumatic line 44 and coupling 42 to the seal stem 38. When evacuated, the bladder 66 collapses on itself. The thermal covering material 68 is bonded to the sealing surface 70 of the bladder, i.e. the surface facing the tail pipe, with a high temperature silicone rubber adhesive 72, such as RTV 159. To allow for uniform expansion of the bladder during inflation, the fibers of the protective covering must be oriented at an approximate 45° ($\theta=45°$, FIG. 2) angle to the longitudinal axis of the bladder, i.e. the axis of the bladder along the length L of the housing. Bonding the protective material to the sealing surface of the bladder allows the material to be withdrawn, in unison with the bladder in the evacuated state, such that the seal recedes entirely within the internal groove formed by the annular collar 18. As a result, the internal diameter of the seal in the evacuated state is greater than the internal diameter D of the housing so that the mating surface 70 lies beneath the plane of the inside wall surface 22 of the housing. This, together with the guide surfaces formed by the wall surface 22 and minimum diameter station 28, permit the steering of the connector over the tail pipe without abrasion of the seal.

FIG. 4 is a second sectioned illustration of the inlet port portion which illustrates the inflated state of the seal around the outside surface of an inserted test vehicle tail pipe 74. The seal expands under the positive pressure applied from the pressure source 54 through the three-way valve 46 (FIG. 1) in response to operator selection of the positive pressure state through the switch 48. The seal expands uniformly to the point at which it contacts the surface of the tail pipe. Continued inflation of the bladder causes the seal to deform along the contour of the mating outside surface of the tail pipe. This allows the seal to grab the tail pipe with sufficient force to prevent removal of the connector. The seal once inflated provides a large area sealing surface along the tail pipe, so as to insure a leak-proof barrier between the ambient atmospheric pressure 76 and the higher pressure within the housing resulting from the positive pressure of the exhaust gas 78.

The universal tail pipe connector of the present invention may be used on all vehicle types having a circular, or essentially circular cross section tail pipe of any diameter. The internal diameter of the housing of the connector is selected so as to be greater than that anticipated for the largest tail pipe of a test vehicle. The inflatable seal is operated bi-stably in either an evacuated state of an inflated state. In the evacuated state it is withdrawn to the internal groove form by the annular collar of the housing and is protected from abrasion during insertion of the tail pipe into the housing. In the expanded state it provides a positive leak-proof seal for any of the range of tail pipe diameters. The evacuated or inflated states are selected by an operator through the use of a three-way valve which receives a positive pressure and a vacuum pressure signal, each from a related, external source.

Although the invention has been shown and described with respect to a best mode embodiment thereof, it should be understood by those skilled in the art that various changes, omissions, and additions may be made therein without departing from the spirit and the scope of the invention.

We claim:

1. Apparatus for connecting exhaust emissions equipment to combustion engine exhaust pipes of varying diameter, in a system having a source of positive pressure signals and a source of vacuum pressure signals, comprising:

a hollow cylindrical housing having longitudinally spaced inlet and outlet ports for connecting to the exhaust pipe and emissions equipment respectively, said inlet port and said housing having internal diameters equal to or greater than the largest diameter exhaust pipe, said housing including an annular collar for providing therein an internal annular groove adjacent said inlet port;

three-way valve means, having first and second input apertures connected to the sources of positive pressure and negative pressure signals respectively, and having an output aperture, said valve means including switch means responsive to operator control for connecting, alternately, each input aperture to said output aperture; and an inflatable seal, including an inflatable annular bladder of high temperature silicone rubber secured in said internal annular groove in axial registration within said housing by a pneumatic stem assembly adapted to engage said annular collar, said bladder being connected through said stem to said output aperture of said three-way valve for responding, alternately in dependence on operator control, to said positive pressure and vacuum pressure signals, said bladder retracting in response to applied vacuum pressure signals and nestling along a mating surface thereof within said internal annular groove so as to allow unobstructed internal passage of the exhaust pipe within said housing, said bladder inflating in response to applied positive pressure signals to provide a positive pressure seal between a sealing surface thereof and the outer surface contour of the inserted exhaust pipe.

2. The apparatus of claim 1, wherein said inflatable seal further comprises a thermal protective covering suitably disposed along the sealing surface of said bladder so as to expand and contract in unison therewith during inflation and evacuation of the seal, for providing thermal insulation between said sealing surface and the surface of the exhaust pipe during inflation of said bladder.

3. The apparatus of claim 2, wherein said thermal protective covering comprises a high temperature woven fiber material bonded to said sealing surface with a high temperature silicone rubber adhesive.

4. The apparatus of claim 2, wherein said thermal protective covering comprises woven fiberglass mat material bonded to said sealing surface with a high temperature silicone rubber adhesive.

5. The apparatus of claims 3 or 4, wherein said thermal protective covering is positioned on said sealing surface so as to provide, with said seal disposed in said internal annular groove, an approximate forty-five degree orientation of said covering fibers to the longitudinal axis of said housing.

* * * * *